United States Patent Office.

ROBERT G. LOFTUS, OF CHELSEA, MASSACHUSETTS.

Letters Patent No. 113,782, dated April 18, 1871.

IMPROVEMENT IN THE PURIFICATIONS OF OILS AND FATS BY ACIDS.

The Schedule referred to in these Letters Patent and making part of the same.

*To all persons to whom these presents may come:*

Be it known that I, ROBERT G. LOFTUS, of Chelsea, of the county of Suffolk and State of Massachusetts, have invented a new and useful Improvement in the Purification of Oils or Fats by Acids and Alkalies; and I do hereby declare the same to be fully described in the following specification.

In treating certain heavy oils, such as resin-oil, for instance, with sulphuric acid and an alkali for the purpose of deodorizing and otherwise purifying them, it has been found that, owing to the density of the oil, the acid, or a portion thereof, would remain in a state of mechanical suspension within the oil, its separation from the oil by gravity or settlement therein being very desirable to have expeditiously effected preparatory to the employment of the alkali.

I have discovered that by adding to the oil, previous to the application of the acid and agitation of the oil therewith, or while the oil and acid are together, a sufficient amount of naphtha or other proper solvent, whereby the density of the oil is reduced, I am enabled to overcome the tendency of the acid to remain in mechanical suspension in the oil and cause it to readily deposit.

Where the resin-oil is of a density about 14° Beaumé I add to each gallon thereof about three quarts to a gallon of naphtha of about 70° Beaumé. I stir up the oil and naphtha until they may become thoroughly combined, and afterward treat the compound with sulphuric acid and alkali in the common way of refining oils thereby.

After the oil has been treated by the acid and alkali as is well understood by oil purifiers, the next part of the process is the separation of the solvent or naphtha. To accomplish this, I proceed as follows:

I run the naphtharized and purified oil into a steam still, that is, a still to be heated by steam in a coil of pipe, and I introduce into the oil by means of a pipe moist steam at from 212° to 220° Fahrenheit, and continue the introduction until the naphtha or solvent may have been abstracted by the steam, and with it carried into the condenser and there condensed.

In the condenser the naphtha or solvent and condensed steam will separate, the naphtha or solvent rising to the surface of the water, from which it may be drawn or removed.

In order to facilitate the process, the mixture in the still may be heated more or less by the coil. Finally, the purified oil may be extracted from the still and run into a tank, and put into suitable vessels for sale or use.

What I claim as my invention in the treatment of a heavy oil by an acid, or such and an alkali, for the purification of such oil, is—

1. The employment of a naphtha or solvent with the oil and acid, substantially as and for the purpose as specified.

2. The employment of naphtha or a solvent in the process of treating oil with acid and alkali, as set forth, and subsequently subjecting the treated oil to the action of steam in a still, or to distillation, all substantially as and for the purpose of separating the solvent from the oil, as explained.

Witnesses:     ROBERT G. LOFTUS.
R. H. EDDY,
S. N. PIPER.